Figure 1:
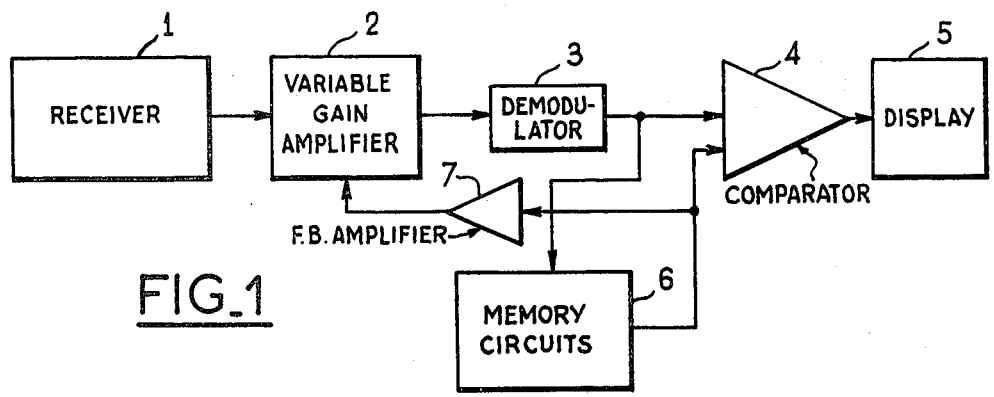

United States Patent [19]

Le Beyec

[11] 4,159,477

[45] Jun. 26, 1979

[54] ARRANGEMENT FOR STABILIZING THE FALSE ALARM RATE IN A RADAR

[75] Inventor: Guy Le Beyec, Paris, France

[73] Assignee: Thomson-CSF, Paris, France

[21] Appl. No.: 869,762

[22] Filed: Jan. 16, 1978

[30] Foreign Application Priority Data

Jan. 18, 1977 [FR] France .................... 77 01330

[51] Int. Cl.² ............................................... G01S 7/34
[52] U.S. Cl. .................................................. 343/7 A
[58] Field of Search ........................... 343/7 A, 7 AG

[56] References Cited

U.S. PATENT DOCUMENTS

| | | | |
|---|---|---|---|
| 3,680,095 | 7/1972 | Evans | 343/7 A |
| 3,781,882 | 12/1973 | Holberg | 343/7 A |
| 3,781,883 | 12/1973 | Effinger | 343/7 A |
| 4,058,809 | 11/1977 | Chudleigh, Jr. | 343/7 AG X |
| 4,074,264 | 2/1978 | Wilmot | 343/7 A X |

Primary Examiner—T. H. Tubbesing
Attorney, Agent, or Firm—Cushman, Darby & Cushman

[57] ABSTRACT

An arrangement for stabilizing the false alarm rate in a radar. The arrangement is provided with, in series, an amplifier with a variable and controllable gain, a demodulator and a comparator with a variable detection threshold. The signals after demodulation into video signals are chopped into range gates. A set of memories allows the mean values of the video signals to be stored. A control circuit allows the gain of the amplifier and the variable detection threshold of the comparator to be controlled after read out of the memories. The gain of the amplifier is varied in the opposite direction from the amplitude of the signals read out from the memories and the variable detection threshold of the comparator is varied in the same direction as the amplitude of the signal read out from the memories. A feed back amplifier is arranged between the memories and the gain control input of the amplifier.

9 Claims, 5 Drawing Figures

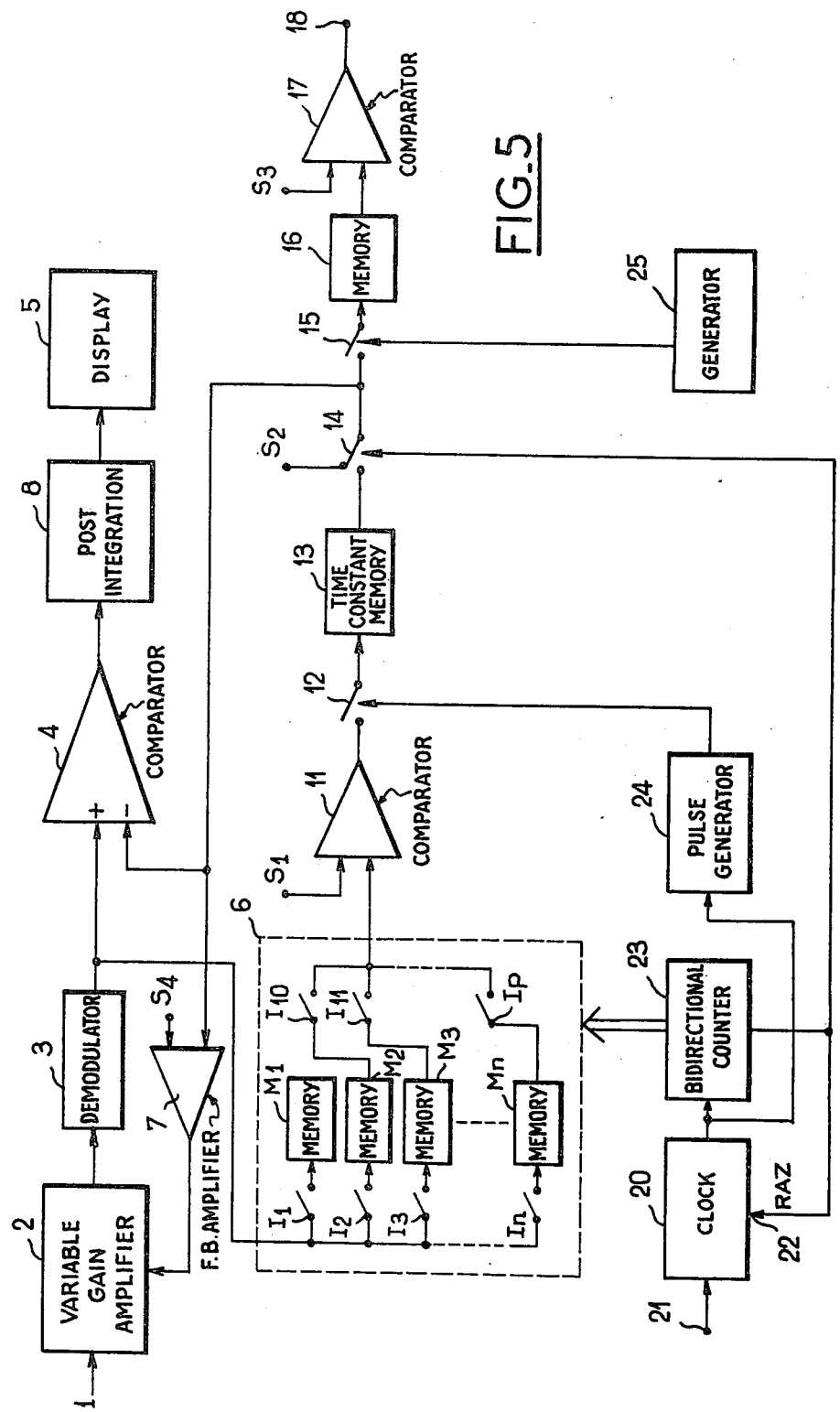

ARRANGEMENT FOR STABILIZING THE FALSE ALARM RATE IN A RADAR

The invention relates to an arrangement for stabilizing the false alarm rate in a radar.

The detection and tracking performance of a radar is restricted by the presence of ill-defined echoes, clouds, or interference echoes caused by reflection from the ground or the sea. An echo from a target whose level is higher than or equal to that of the interference echoes may be masked by the interference echoes as a result of the inadequate dynamic range of the radar display.

The regulation of the level of the echoes, which generally takes the form of regulating the noise level at the end of the repetition cycle, does not allow for the presence of various interference echoes which are received in the course of the cycle. There is therefore a danger that such interference echoes will be detected, which causes a false alarm each time it occurs if the amplitude of these echoes is greater than the regulation threshold set by the noise level at the end of the repetition cycle.

One object of the present invention is to overcome this disadvantage, that is to say to maintain a false alarm rate which is as nearly constant as possible by using as a reference not the noise level at the end of the repetition cycle but the actual level of the interference echoes.

The invention thus makes it possible to obtain a constant contrast in the image on the radar display and thereby makes it easier for the display to be adjusted and maintained.

In accordance with a feature of the invention, individual memory means are employed, in synchronization with the marking out of each range gate in the radar repetition cycles, to store the mean value of the received video signal in each gate, this mean value being applied on the one hand to the gain control of an amplifier for the reception signals, which amplifier is situated upstream of the memories, and on the other hand to the reference input of a threshold comparator to act as a detection threshold for the video signals.

A useful signal the length of which is generally very short in comparison with the length of a range gate, will not be affected by this processing, and if its amplitude is greater than the aforesaid mean value, it will appear with a high contrast on the screen of the display, even if this echo is surrounded by interference signals, the length of which is generally a multiple of that of the gate.

The invention thus affords the following advantages:

It ensures contrast in the image on the display by stabilizing the number of false alarms to the noise itself or to the interference echoes.

The use of a video signal which has been standardized by the aforesaid processing makes the screen of the radar less sensitive to brightness variations depending on the parameters of the tube.

It is possible to generate an echo presence signal the reference of which is the mean value of the echoes in each range interval.

Finally, the invention makes it possible to prevent the tracking system associated with the radar from locking on to interference echoes.

Figure 2:
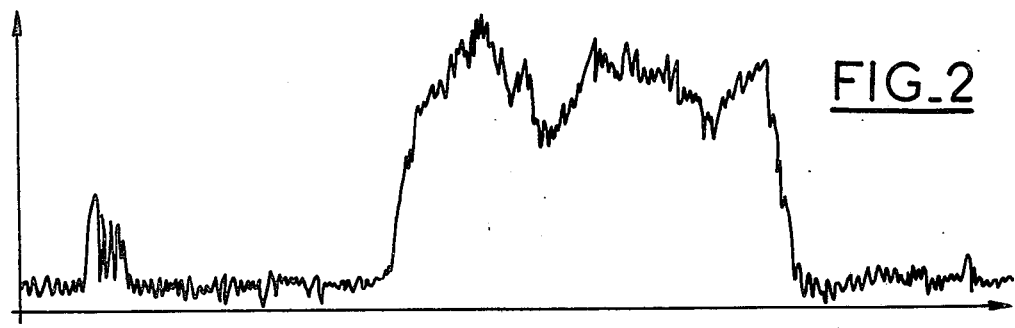
Figure 3:
Figure 4:
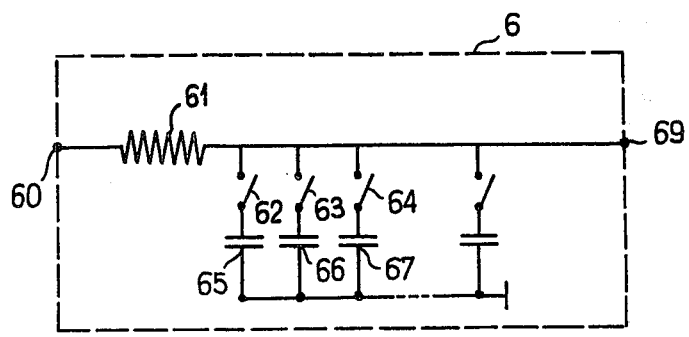

Other features and advantages of the invention will become apparent from a perusal of the following description, which is illustrated by the Figures, which show:

FIG. 1, a block diagram of the arrangement according to the invention,

FIG. 2, a representation of the signals received in the course of one repetition cycle, FIG. 3, a representation of the mean value of these signals, FIG. 4 an embodiment of memory circuits and FIG. 5, an example of the invention applied to a radar system.

FIG. 1 is a block diagram of the arrangement according to the invention.

The point of departure is the receiver 1 of the radar, which emits intermediate frequency received signals in the course of each repetition cycle. These repetition cycles are divided into range gates or intervals under the control of the general synchronization of the radar, which is not shown for reasons of simplicity and clarity. The intermediate frequency signals are applied to a controllable, variable gain amplifier 2 and are then demodulated at 3 and finally applied, at video frequency, to a threshold comparator 4, the output of comparator 4 being applied to the input of a radar display 5 which may for example comprise a cathode ray tube, thereby forming a reception channel.

The output of the demodulator 3 is coupled to memory circuits 6 which operate in synchronization with the range gates. The output of the memories is coupled to the reception channel on the one hand through the reference input of the threshold comparator 4 and on the other hand through the gain control input of the amplifier 2 by means of a feedback amplifier 7 responsible for matching between the output signal from the memories and the gain control input.

The useful reception period in the course of each repetition cycle may be divided into ninety-two range gates for example. In each range gate, the mean value of the video signal is placed in store. The device 6 thus contains ninety-two different memories, one for each range gate. The mean value placed in store is used first to control the gain of the amplifier 2. The higher the mean value the more the gain is reduced. The effect of this is to reduce the variations in noise level resulting from variations in gain at intermediate frequency or from interference echoes received by the radar. The gain control loop 2, 3, 6, 7, thus reduces the dynamic amplitude of the received signal. The mean value which is stored in each range gate is also used as a threshold in a comparator 4 which standardizes the video. This comparator is in fact a bottom clipping circuit, that is to say a circuit which transmits the difference between the amplitude of the video signal and that of the reference when the difference is positive but nothing when the difference is negative. In this way the threshold and the linear video vary in the same proportion and the number of false alarms remains constant.

FIG. 2 shows the waveform of the received signal in one repetition cycle as an example. Superimposed on the noise level, which is constant throughout the cycle, are two interference echoes, for example. The amplitude of the second echo varies and its length is equivalent to a plurality of range gates.

The useful length of the repetition cycle is divided for example into ninety-two range gates each of 4.6 $\mu$s. The video signal is integrated for the duration of each range gate. Each of the means of the video signal is held in an analogue memory (there are thus ninety-two memories). The mean of the video signal when integrated with a time constant substantially equal to the length of a range gate is shown in FIG. 3. In actual fact, it is not recorded as a continuous signal but rather as a succession of ninety-two analog voltages which are stored in the corresponding ninety-two memories.

A useful echo, from an aircraft for example, produces an echo the length of which is approximately 10 times shorter than the integration time constant. Thus, the contribution which this echo makes to the mean of the signal in the corresponding range gate is practically zero. The gain of the amplifier and the threshold of the comparator are thus adjusted to the mean "appearance" of the interference echo (from a cloud for example) and the useful echo is in fact seen. In addition, being reduced to the threshold level, the interference echo does not appear on the screen of the display.

A principle advantage of the arrangement according to the invention is that it stabilizes the false alarm rate on the display whatever be the gain of the receiver and the various interference echos received.

The false alarm rate is the ratio between the mean duration of the unwanted echos and the mean interval separating two echos.

Thus, interference echoes (clouds, ground and sea echoes, thermal noise) appear at a constant, low density on the screen. Processing by post-integration of the signals over a plurality of repetition cycles enables the contrast between the useful echoes and the interference echoes to be accentuated still further.

FIG. 4 shows an embodiment of the time-constant memory circuit 6.

It has a input terminal 60 connected to a resistor 61. The other terminal of this resistor is connected to an output terminal 69. Also connected to this terminal are ninety-two capacitors (65, 66, 67 etc.) via ninety-two respective switches (62, 63, 64 etc.). The other plates of the capacitors are connected to the earth of the circuit. Only the first three pairs of switches and capacitors are numbered, by way of example.

The switches are operated sequentially in synchronization with the marking out of the range gates. For example, during the first range gate, switch 62 closes and capacitor 65 charges through resistor 61. Capacitor 66 then charges during the second gate and so on.

Rather than a network of discrete components in the form of capacitors, it is preferable to use up-to-date components such as charge coupled devices (CCD's).

FIG. 5 is a detailed view of the circuits of a radar receiver incorporating an arrangement according to the invention.

As in FIG. 1, the intermediate frequency signals from the receiver 1 are applied to a variable gain amplifier 2 and then to a demodulator 3. The video frequency signals at the output of the demodulator are compared with a threshold in a bottom-clipping comparator 4. The resulting signals are then subjected to post-integration at 8 over a plurality of repetition cycles and are then applied to a radar display 5.

The gain of the amplifier 2, and the threshold of the comparator 4, are controlled by means of a memory circuit 6 which receives the video signals from the output of the demodulator 3. These signals are applied simultaneously to n switches I1, I2, I3 ... In which are coupled respectively to n memories M1, M2, M3 ... Mn whose time constants are substantially equal to the duration of one range gate. The switches Ii, ... In are operated in synchronization with the marking out (delimitation) of the range gates in such a way that each of the memories charges to the mean value of the video signal in the gate concerned. Each of the memories may be formed by a resistor and a capacitor or by an integrated semiconductor device as indicated with reference to the previous Figure. The contents of the memories are recovered by means of n−1 switches I10, I11, ... Ip which are synchronized with switches I1, I2 ... In−1 respectively. While a memory Mi is charging to the mean value of the video signal in the corresponding gate i, the content of the next memory Mi+1 is being read out. This content is the mean value of the video signal in the next gate i+1 as recorded in the previous repetition cycle. This value is to be used at the same time as the signals from gate i+1 are received, i.e. with a displacement in time equal to one repetition cycle. Since this value is read out in the course of gate i, it must be subjected to a delay equal to the length of the gate.

The memories M1, M2, ... Mn may be produced from capcitors and resistors as shown in FIG. 4, or again by using charged coupled circuits.

It is also possible to use digital memories preceded by an analog/digital converter and followed by a converter which converts in the opposite, i.e. digital-/analog, direction. The mean value of the video signal may be calculated by digital circuits, or again upstream of the memories with an analog time-constant.

The mean value read out is compared with a threshold S1 in a comparator 11. The output signal from comparator 11 is applied to a sample and hold circuit formed by a switch 12 and a time constant memory 13. Switch 12 closes for a time substantially less than the length of a gate in order to eliminate interference signals due to switching transients. The object of the time constant of memory 13 is to compensate for the advance of the reading of the mean value. It is substantially less than the length of a gate. This arrangement of the circuits is necessary because it is impossible to carry out simultaneously in the same memory both the storage of the mean value of the video signal from the gate and the read out of this mean value. Since it is necessary to allow for the transfer delays in the various circuits, it is more practical to read out the content stored in the previous repetition cycle one gate in advance and to delay this signal in order to cause it to coincide with the appropriate gate. The time constant of the memory 13 is therefore accurately calculated in the course of trials to give an exact coincidence. The mean value signal is then applied, after passing through a switch 14, on the one hand to the threshold comparator 4 and on the other hand to the feedback amplifier 7 which controls the gain of the intermediate frequency amplifier 2. Amplifier 7 may possibly have an inverting input in order to compare the signal which is applied to it with a threshold S4.

In position 1, switch 14 connects the memory 6 to the reception channel and in position 2 it applies a fixed signal S2 to the reception channel. This switch is intended to transmit to the reception channel a fixed threshold and gain-control signal at the end of a repetition cycle, since outside the useful reception zone the signal in store may be considered as zero in practice.

Another switch 15, which is associated with a memory 16 having a time constant greater than or equal to the length of the repetition cycle and with a comparator circuit 17 having a threshold S3, supplies to a terminal 18 a signal for the presence of an echo in a pair of predetermined range gates. The switch 15 is controlled by the range measuring marker when the system is in the tracking phase. The threshold S3 enables the presence threshold to be adjusted. The range measuring marker is supplied by a generator 25. It is a square wave signal whose length is substantially equal to the length of two consecutive range gates.

The signals synchronizing the arrangement as a whole are supplied by a clock 20, a bidirectional counter 23 and a pulse generator 24.

The clock, whose frequency is close to 140 KHz, is governed by the synchronization of the radar. The clock pulses are counted by the seven bit bidirectional counter, which operates the switches I1, . . . In, I10 . . . Ip. These switches are produced from analog gates for example. They enable the linear video to be chopped into range gates and to be integrated in respective ones of the ninety-two memories. At the same time the next memory is read out and the read out is then delayed to be used in the next gate.

When the counter has reached the last range gate, it causes the clock to stop by acting on a zero-reset input (RAZ) and it changes over switch 14, which transmits to the reception channel a fixed value S2 at the end of the repetition cycle, that is to say outside the useful zone.

The clock is unblocked in the next repetition cycle by a fresh synchronizing pulse.

A cloud, for example, whose level is 30 dB higher than the radar noise, is cut down by the reduction of the gain to approximately 6 dB and the threshold of the comparator is substantially doubled. The false alarm rate is thus not affected by this interference.

The dynamic range of the arrangement according to the invention is better than 80 dB, which is perfectly suitable for regulating for the noise produced by a noise jammer.

The arrangement according to the invention restores the contrast required to detect and track a target in a region suffering from interference echoes.

In addition, the picture on the screen of the display become less sensitive to misadjustment of the display.

The post-integration which employs one memory for each range gate improves still further the contrast at detection.

The invention also offers a possibility of safeguarding the radar against spoofing transmitters or metal anti radar chaff. It is chiefly applicable to radar stations.

What is claimed:

1. An arrangement for stabilizing the false alarm rate in a radar which comprises, in series:
   reception means and amplifying means whose gain is variable and controllable,
   means for demodulating the received signals and means for comparing the said signals with a variable detection threshold, means for displaying the signals, said arrangement including further,
   means for chopping the demodulated signals into range gates,
   respective memory means for storing the mean values of the video signals contained in each of the range gates,
   means for reading out the stored signals and for controlling by means of said signals the gain amplifying means and the detection threshold of said comparison means, the gain of said amplifying means varying in the opposite direction from the amplitude of the signals read out from the memories, and said threshold of said means for comparing the said signals varying in the same direction as the amplitude of the signal read out from the memories in operation, and
   a feed back amplifier arranged between said memories and the gain control input of the said amplifying means.

2. An arrangement as claimed in claim 1, further comprising means for post integrating said signals over a plurality of repetition cycle, said integrating means being inserted between said means for comparing said signals with a variable detection threshold and said means for displaying said signals.

3. An arrangement as claimed in claim 1, comprising switching means inserted between said memory means and said threshold control inputs, said switching means allowing to apply to said control inputs a signal of predetermined value after the last range gate in each repetition cycle.

4. An arrangement as claimed in claim 1, including a device for detecting the presence of targets, said device employing the signals read out from the memories and means for comparing these signals with a given threshold.

5. The arrangement of claim 1 wherein said memory means includes:
   analog memories equal in number to said range gates of the radar; and
   a common resistor for receiving the video received signals, and wherein said means for chopping said demodulated signals comprises switching means for connecting said common resistor sequentially to each of said memories in synchronization with the delimitation of said range gates.

6. The arrangement of claim 1 wherein said memory means includes:
   analog memories equal in number to the number of range rates of said radar, each of said memories having a time constant associated therewith substantially equal to the length of a gate or to a multiple of said length, and wherein said means for chopping said demodulated signals comprises first switching means for applying said received video signals sequentially to each of said memories, and wherein said means for reading out the stored signals comprises second switching means synchronized with said first switching means for reading out each of said stored signals in sequence with a displacement of one memory.

7. The arrangement of claim 6 further including delay means inserted between said memory means and said gain and threshold control means for compensating any displacement in the read out from said memories.

8. The arrangement of claim 6 wherein said analog memories include charge coupled devices.

9. The arrangement of claim 1 wherein said memory means comprises:
   means for converting analog signals into digital signals;
   digital memories coupled to said means for converting analog signals into digital signals;
   means coupled to said digital memories for converting digital signals from said digital memories into analog signals; and
   means for controlling the displacement of said digital memories.

* * * * *